United States Patent Office 3,641,213
Patented Feb. 8, 1972

3,641,213
SYNERGISTIC UV ABSORBER COMBINATION FOR POLYPROPYLENE-POLYVINYLPYRIDINE BLEND
John Leo Rodgers, Somerville, N.J., assignor to American Cyanamid Company, Stamford, Conn.
No Drawing. Filed Feb. 27, 1969, Ser. No. 803,087
Int. Cl. C08f 33/08, 45/60
U.S. Cl. 260—895                    7 Claims

ABSTRACT OF THE DISCLOSURE

An oxidation and light stable composition of matter comprising a polymer blend of a major proportion of a polypropylene and a minor proportion of polyvinylpyridine, and from about 0.1% to about 5%, based on the weight of the polymer blend, of a stabilizing combination of:
(a) a 2-hydroxybenzophenone ultraviolet absorber of the formula:

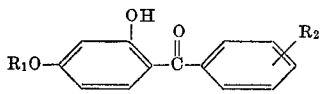

wherein $R_1$ is alkyl having 8 to 18 carbon atoms, and $R_2$ is a member selected from the group consisting of hydrogen, methyl, carbomethoxy, carbethoxy, and halogen; and
(b) an ultraviolet light absorber selected from the group consisting of (2 - hydroxyaryl)-s-triazines, 2-(2-hydroxyaryl)benzotriazoles and mixtures thereof; the weight ratio of (a) and (b) being in the range of from about 5:1 to about 1:5.

---

This invention relates to the stabilization of polypropylene-polyvinylpyridine blends. More particularly, the present invention provides for light stable blends of polypropylene and polyvinylpyridine containing a 2-hydroxybenzophenone and either a 2-(2-hydroxyaryl)benzotriazole or a 2-hydroxyaryl-s-triazine.

Unstabilized polypropylene-polyvinylpyridine blends are generally rather unstable under ambient conditions. The blends gradually become oxidized upon contact with the atmosphere and as a result become brittle to an undesirable degree. It is therefore desirable to improve oxidation resistance of polypropylene-polyvinylpyridine blends without adversely affecting the physical and chemical characteristics of the blend. These blends have been found to be particularly useful where it is desirable to obtain dyeable fibers. Thus, polypropylene alone is difficult to dye and therefore it becomes desirable to incorporate therein minor amounts of materials which improve dyeability thereof. In this respect, polyvinylpyridine has been found to be particularly useful.

Presently, improved stability against embrittlement for these blends is accomplished by incorporating therein, in relatively small amounts, compounds which have been found to enhance oxidation stability. A source of polypropylene instability is exposure to ultraviolet light. It is believed that ultraviolet light catalyzes the oxidation of the polymer and results in the formation of carbonyl groups in the polymer chain concomitant with embrittlement. No discoloration is usually noted when polypropylene is exposed to ultraviolet radiation. Polypropylene containing 3% polyvinylpyridine also degrades by UV light through an oxidation reaction which results in the formation of carbonyl and loss of physical properties. However, discoloration is also observed with the polypropylene-polyvinylpyridine blends after exposure to UV light. At the present time, certain 2-hydroxybenzophenones have been found to be very useful in alleviating degradation of the blends resulting in embrittlement. However, these same 2-hydroxybenzophenone compounds do not provide any significant improvement against discoloration. In addition, UV absorbers such as 2-(2-hydroxyaryl)benzotriazoles and 2-hydroxyaryl)-s-triazines when employed alone in these blends provide only minimal protection against embrittlement or discoloration and therefore from a practical standpoint are not useful for this purpose.

It is an object of the present invention to provide polypropylene-polyvinylpyridine compositions which are oxidation-stable and are stable against discoloration caused by ultraviolet light. It is a further object of the present invention to provide a method for stabilizing polypropylene-polyvinylpyridine blends.

In accordance with the present invention, there is provided a stable polypropylene-polyvinylpyridine blends containing a mixture of (1) a 2-hydroxybenzophenone and (2) either or both a 2-(2-hydroxyaryl)benzotriazole and/or a 2-hydroxyaryl-s-triazine. The improved stability imparted to polypropylene by these mixtures is indeed surprising in view of the fact that the 2-hydroxybenzophenones employed herein do not provide satisfactory color stability to polypropylene-polyvinylpyridine blends and further because the 2-(2-hydroxyaryl)-triazoles and the 2-hydroxyaryl-s-triazines do not provide either satisfactory stability against embrittlement or satisfactory color stability.

The 2-hydroxybenzophenone employed herein are represented by Formula I:

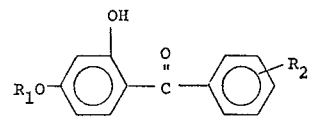

I wherein $R_1$ is alkyl from 8 to 18 carbons and $R_2$ is hydrogen alkylhaving from 1 to 4 carbons, carboxy, carbomethoxy, carboethoxy or chlorine. The preferred 2-hydroxybenzophenones represented by Formula I for purposes of the invention are those wherein $R_1$ is alkyl from 8 to 12 carbons and $R_2$ is either hydrogen or methyl at the 2-position. Among the suitable 2-hydroxybenzophenones are 2-hydroxy-4-octyloxybenzophenone,
2-hydroxy-2'-methyl-4-octyloxybenzophenone,
2-hydroxy-4-decyloxybenzophenone,
2-hydroxy-4'-carbomethoxy-4-decyloxybenzophenone,
2-hydroxy-4'-carboethoxy-4-octyloxybenzophenones,
2-hydroxy-4'-chloro-4-octyloxybenzophenone and the like.

Any 2-hydroxyaryl-s-triazine ultraviolet light absorber can be used so long as it performs the function generally required of an ultraviolet light absorber. These functions are well known to be high absorbancy in the region of about 300–400 millimicrons, low absorbancy in the range above about 400 millimicrons, and solubility in and compatibility with polypropylene and polypropylene blends and stability to light and heat.

Suitable 2-hydroxyaryl-s-triazine which can be employed are those represented by the following general Formula II. By the term "2-hydroxyaryl-s-triazines" as used in the specification and claims is meant the compounds represnted by Formula II.

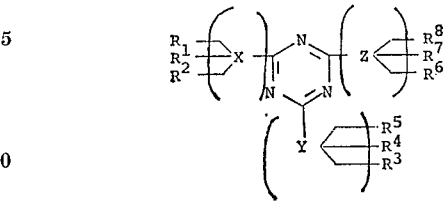

II

In Formula II, Y and Z are each lower alkyl or aromatic, carbocyclic radicals of less than three 6-membered rings (e.g. phenyl, naphthyl and biphenyl), X is an aromatic carbocyclic radical of less than three 6-membered rings (e.g., phenyl, naphthyl and biphenyl) being substituted by an hydroxy group ortho to the point of attachment to the triazine nucleus; and each of R, $R^1$, $R^2$, $R^3$, $R^4$, $R^5$, $R^6$, $R^7$ and $R^8$ being either hydrogen, hydroxy (preferably in the 2, 4 and/or 5-position of the aromatic nucleus), alkyl (e.g., methyl, t-butyl, cyclohexyl, t-octyl, n-octyl and dodecyl), alkoxy (e.g., methoxy, n-butoxy, 2-ethylhexyloxy and n-octyloxy) alkenoxy (e.g., allyloxy, crotyloxy), sulfonic, carboxy, halo (e.g., iodo, bromo and chloro), haloalkyl (e.g., dichloromethyl and trifluoromethyl) and acylamino (e.g., alkanoylamino such as acetamido; monocyclic carbocyclic aromatic-lower alkyl amido such as phenylacetamido).

A preferred class of triazines within the scope of Formula II is that represented by Formula III.

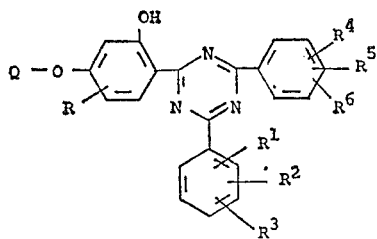

III wherein Q is hydrogen or alkyl (e.g., methyl, ethyl, propyl, n-butyl, t-butyl, cyclohexyl, n-hexyl, n-octyl and n-dodecyl) and R, $R^1$, $R^2$, $R^3$, $R^4$, $R^5$ and $R^6$ are as hereinbefore defined.

A particular preferred class of ultraviolet absorbers for the purpose of this invention are symmetrical tris-orthohydroxyphenyl (or naphthyl)-s-triazines further substituted in the aryl moieties at the 4-position, i.e., meta to the hydroxy group by an hydroxy or alkoxy radical.

Suitable triazines include 2,4-bis(2,4-dimethylphenyl)-6-(2-hydroxy-4-allyloxyphenyl)-s-triazine,
2-butyl-4,6-bis(2-hydroxy-4-octyloxyphenyl)-s-triazine,
2,4-bis(2,4-dimethylphenyl)-6-(2-hydroxy-4-octyloxyphenyl)-s-triazine,
2,4,6-tris(2-hydroxy-4-octyloxyphenyl)-s-triazine,
2,4,6-tris(2-hydroxy-1-naphthyl)-s-triazine,
2-(2,4-dihydroxyphenyl)-4,6-diphenyl-s-triazine and the like.

Suitable 2-(2-hydroxyaryl) benzotriazoles which can be employed in the compositions of this invention are those known to be ultraviolet light absorbers. Any 2-(2-hydroxyaryl)benzotriazole ultraviolet light absorber can be used so long as it performs the functions generally required of an ultraviolet light absorber for polypropylene. Suitable 2-(2-hydroxyaryl)benzotriazoles are those disclosed by U.S. Pats. 3,004,896 and 3,189,615. The benzotriazoles useful in the present invention are represented by Formula IV:

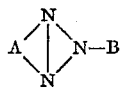

IV wherein A represents an o-phenylene radical bound by two neighboring carbon atoms to two nitrogen atoms of the triazole ring such as o-phenylene, o-phenylene carboxylic acid (lower alkyl) ester, ethyl, sulphonyl-o-phenylene, chloro-o-phenylene, lower alkoxy-o-phenylene and lower alkyl-o-phenylene and B represents a phenyl radical having a free hydroxyl group in the 2-position and which can be further substituted with a member selected from the group consisting of alkyl, alkoxy, lower carbalkoxy, cyclohexyl, phenyl and halogen.

Among the useful benzotriazoles are 2-(2-hydroxy-5-tertiaryoctylphenyl)benzotriazole,
2-(2-hydroxy-5-methylphenyl)benzotriazole,
2-(2-hydroxy-4-allyloxyphenyl)-benzotriazole,
2-(2-hydroxy-3-tertiarybutyl-5-tert-octylphenyl)-benzotriazole,
2-(2-hydroxy-4,5-dimethylphenyl)benzotriazole-5-carboxylic acid butyl ester,
2-(2-hydroxy-3,5-dichlorophenyl) benzotriazole,
2-(2-hydroxy-5-methylphenyl)benzotriazole-5-ethyl sulfone and the like.

The mixture of the (1) 2-hydroxybenzophenone and (2) either or both (a) the 2-(hydroxyaryl)benzotriazole and/or (b) the 2-hydroxyaryl-s-triazine is employed in amounts of between about 0.1 to about 5.0% by weight, preferably between about 0.25 to about 1.0% by weight. The weight ratio of the 2-hydroxybenzophenone to either or both the 2-(2-hydroxyaryl)benzotriazole and/or the 2-hydroxyaryl-s-triazine in the UV absorber combination is in the range of from about 5:1 to about 1:5.

The UV absorbers of the present invention can be employed in the polypropylene blends either alone or in the presence of other stabilizers. Suitable thermal stabilizers may include mononuclear hindered phenols such as 2,6-di-t-butyl-p-cresol, 2,4,6 - tri-t-butylphenol, butylated hydroxyanisole, and 3,5-di-t-butyl-4-hydroxyhydrocinnamic acid, octadecyl ester; bisphenols such as 2,2'-methylenebis(4-methyl-6-t-butylphenol), 4,4'-methylenebis(2,6-di-t-butylphenol), 4,4'-butylidenebis(6-t-butyl-m-cresol), 2,2'-thiobis(4-methyl-6-butylphenol), and 4,4'-thiobis(6-t-butyl-m-cresol) and polynuclearphenols such as 2,6-bis(2-hydroxy-3-t-butyl-5-methylbenzyl)-p-cresol, 3,5-di-t-butyl-4-hydroxyhydrocinnamic acid, tetrapentaerythritol ester, and the like.

Suitable secondary stabilizers which can be employed include derivatives of thiopropionic acid such as dilaurylthiodipropionate, distearylthiodipropionate, ditridecylthiodipropionate and the like. Suitable secondary stabilizers include organic phosphites such as didecylphosphite, diethylphosphite, dioctylphosphite, diphenyldecylphosphite, didecylphenylphosphite, distearylpentaerythritolbiphosphite, tri(p-nonylphenyl) phosphite, trilauryltrithiophosphite and the like can also be used along with the compounds of this invention. Generally, these materials, if employed, are used in concentrations of 0.05 to 1% based on the weight of the polypropylene blends.

The polypropylene-polyvinylpyridine blends which are stabilized in accordance with the present invention can contain between about 1% and about 10% by weight, preferably between about 2% and about 5% by weight of polyvinyl pyridine.

In the examples which follow, the effectiveness of the stabilizers of this invention are measured by the time in hours on exposure to ultraviolet light radiation from a Fluorescent Sunlamp Black Light Unit to reach a 10% decrease in transmittance, and the time in hours to reach an increase in carbonyl content per mil of thickness, of 0.06, the measurements being made of the change in absorbance units on compression molded films of 1.7–2.5 mils in thickness.

In the examples which follow, polypropylene and polyvinylpyridine were blended with the stabilizers by one of the methods described below.

Method 1: A chloroform solution containing the appropriate concentrations of the polyvinylpyridine and the stabilizers was blended with polypropylene powder for 24 hours. The polymer was then dried at 70° C. to remove the solvent.

Method 2: A master batch was prepared by blending the appropriate amount of polyvinylpyridine, dissolved in chloroform, with polypropylene powder for 24 hours. The solvent was evaporated by drying at 70° C. and the stabilizers were added by dry tumbling for 18 hours.

The powder blends prepared according to either of the two methods were placed into the cylinder of a melt-index apparatus at 270°–290° C. and using a 2.2 kg. weight. The extrudate was compression molded to give films of good optical quality. The apparatus employed is described in ASTM D-1238–62T.

The above films can also be prepared by milling the powder blend on a two roll mill at 170°–180° C. and compression molding at 170°–190° C. The films were then exposed to UV radiation as described.

The following examples illustrate the present invention and are not intended to limit the same.

EXAMPLE 1

The formulations set forth below were prepared by Method 1, described above. The films produced had a thickness of between 1.7 and 2.5 mils.

Formulation

| | Parts |
|---|---|
| Polypropylene | 97 |
| Polyvinylpyridine | 3 |
| Distearylthiodipropionate | 0.25 |
| Antioxidant [1] | 0.1 |
| UV Absorber, as shown in Table I. | |

[1] Hexakis (3,5-di-tert. butyl-4-hydroxy methyl benzene.

TABLE I

| | | | FS-BL Exposure | |
|---|---|---|---|---|
| Formulation No. | UV Absorber [1] | Conc. (wt. percent) | Time, hours to 10% decrease in transmittance | Hours to increase in carbonyl/mil of 0.06 |
| 1 | None | | <260 | 100 |
| 2 | A | 0.5 | 270 | 460 |
| 3 | B | 0.5 | 350 | 239 |
| 4 | -A- -B- | 0.5 - 0.5 - | >774 | 1,078 |
| 5 | C | 0.5 | [2] 465 | 372 |
| 6 | -A- -C- | 0.5 - 0.25 - | >774 | 988 |
| 7 | -A- -D- | 0.5 - 0.25 - | >774 | 1,060 |

[1] UV Absorber.—A=2-hydroxy-4-octyloxybenzophenone; B=2-(2-hydroxy-5-tert.-octylphenyl)benzotriazole; C=2,4-bis(2,4-dimethylphenyl) 6-(2-hydroxy-4-octyloxyphenyl)-s-triazine;D-2,4,6-tris(2-hy-droxy-4-octyl-oxyphenyl)-s-triazine.
[2] Polymer was completely degraded.

The data in Table I illustrate the effectiveness of the combination of 2-hydroxy-4-octyloxybenzophenone with either 2-(2-hydroxy-5-tert.octylphenyl)benzotriazole, 2,4-bis(2,4-dimethylphenyl)-6-(2-hydroxy - 4 - octyloxyphenyl)-s-triazine or 2,4,6-tris(2-hydroxy-4-octyloxyphenyl)-s-triazine in that the combinations afford a greater degree of protection of the compositions toward discoloration and oxidative degradation causing embrittlement and carbonyl formation than any of the compounds used alone and unexpectedly greater than the additive effect of the combinations.

EXAMPLE 2

The formulations set forth below were prepared by Method 2 described above. The film produced had a thickness of between 18 and 20 mils.

Formulation

| | Parts |
|---|---|
| Polypropylene | 97 |
| Polyvinylpyridine | 3 |
| Distearylthiodipropionate | 0.25 |
| Antioxidant [1] | 0.1 |
| UV Absorber, as shown in Table II. | |

[1] Hexakis(3,5-di-tert.butyl-4-hydroxy)phenylpropionic acid ester of hexahydroxymethyl benzine.

UV Absorber

B: 2-(2-hydroxy-5-tert-octylphenyl)benzotriazole
E: 2-(2-hydroxy-5-methylphenyl)benzotriazole
F: 2-(2-hydroxy-4-allyloxyphenyl)benzotriazole
G: 2-(2-hydroxy-3-methyl-5-tert-octylphenyl)benzotriazole
H: 2-hydroxy-2'-methyl-4-octyloxybenzophenone
I: 2-hydroxy-4-decyloxybenzophenone
J: 2,4-bis-(2,4-dimethylphenyl)-6-(2-hydroxy-4-allyloxy phenyl)-s-triazine
K: 2-butyl-4,6-bis(2-hydroxy-4-octyloxyphenyl)-s-triazine
L: 5-chloro-2-(5-methyl-3-tert-butyl-2-hydroxyphenyl) benzotriazole

TABLE II

| Formulation No. | UV absorber [1] | Percent conc. | Triazine [1] or benzotriazole | Percent conc. | FS-BL exposure, hrs. to carbonyl A of 0.06 |
|---|---|---|---|---|---|
| 1 | Control | | | | 200 |
| 2 | A | 0.5 | | | 1,700 |
| 3 | A | 0.5 | E | 0.25 | 2,400 |
| 4 | A | 0.5 | B | 0.25 | 3,100 |
| 5 | A | 0.5 | F | 0.25 | 2,650 |
| 6 | A | 0.5 | G | 0.25 | >3,400 |
| 7 | | | E | 0.25 | 500 |
| 8 | | | B | 0.25 | 420 |
| 9 | A | 0.5 | L | 0.25 | >3,400 |
| 10 | | | L | 0.25 | 420 |
| 11 | | | F | 0.25 | 500 |
| 12 | | | G | 0.25 | 420 |
| 13 | G | 0.5 | B | 0.25 | >3,400 |
| 14 | H | 0.5 | B | 0.25 | >3,400 |
| 15 | G | 0.5 | | | 1,600 |
| 16 | H | 0.5 | | | 2,000 |
| 17 | | | J | 0.25 | 500 |
| 18 | | | K | 0.25 | 500 |
| 19 | A | 0.5 | J | 0.25 | 2,600 |
| 20 | A | 0.5 | K | 0.25 | 3,200 |

[1] Meanings of letter designations are given above.

As can be seen from Table II, the combination of the 2-hydroxy benzophenone and either the benzotriazole or the triazine in the polypropylene-polyvinylpyridine blend results in vastly more stable compositions than is obtainable when employing any of the stabilizers alone. Furthermore, the superior stability is obtained independent of the stabilizing effects of the secondary stabilizers since the control was satisfactorily stable for only 200 hours.

EXAMPLE 3

The formulations set forth below were prepared by Method 2 described above. The films produced had a thickness of between 9 and 10 mils.

Formulation

| | Parts |
|---|---|
| Polypropylene | 97 |
| Polyvinylpyridine | 3 |
| 2,6-di-tert.butyl-p-cresol | 0.2 |
| UV Absorber, as shown in Table III. | |

TABLE III

| Formulation | UV Absorber [1] | Conc. (wt. percent) | Benzotriazole | Conc. (wt. percent) | Fade-O-Meter exposure increase in carbonyl absorbance at 5.9μ | | |
|---|---|---|---|---|---|---|---|
| | | | | | 200 hrs. | 400 hrs. | 500 hrs. |
| 1 | None | | None | | 0.31 | >2.0 | |
| 2 | A | 0.5 | do | | 0.08 | 0.29 | 0.42 |
| 3 | None | | B | 0.5 | 0.05 | 0.30 | 1.70 |
| 4 | A | 0.25 | B | 0.25 | 0.02 | 0.13 | 0.2 |

As can be seen from Table III, the combination of the 2 - hydroxybenzophenone and the benzotriazole in the polymer blend results in compositions of improved stability as compared to polymer blends employing either stabilizer alone.

I claim:

1. A composition of matter comprising a polymer blend of a major proportion of a polypropylene and a minor proportion of polyvinylpyridine, and from about 0.1% to about 5%, based on the weight of the polymer blend, of a stabilizing combination of:

(a) a 2-hydroxybenzophenone ultraviolet absorber of the formula:

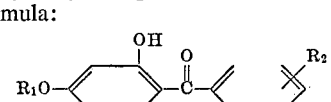

wherein $R_1$ is alkyl having 8 to 18 carbon atoms, and $R_2$ is a member selected from the group consisting of hydrogen, methyl, carbomethoxy, carbethoxy, and halogen; and (b) an ultraviolet light absorber selected from the group consisting of (2-hydroxyaryl)-s-triazines, 2-(2-hydroxyaryl)benzotriazoles and mixtures thereof; the weight ratio of (a) to (b) being in the range of from about 5:1 to about 1:5.

2. The composition of claim 1 wherein (a) is 2-hydroxy-4-octyloxybenzophenone.

3. The composition of claim 1 wherein (b) is 2-(2-hydroxy-5-tert-octylphenyl)benzotriazole.

4. The composition of claim 1 wherein (b) is 2,4-bis-(2,4-dimethylphenyl)-6-(2-hydroxy-4-octyloxyphenyl)-s-triazine.

5. The composition of claim 1 wherein (a) is 2-hydroxy-2'-methyl-4-octyloxybenzophenone.

6. The composition of claim 1 wherein (a) is 2-hydroxy-4-decyloxybenzophenone.

7. The composition of claim 1 wherein (b) is 2,4,6-tris(2-hydroxy-4-octyloxyphenyl)-s-triazine.

References Cited

UNITED STATES PATENTS

| | | | |
|---|---|---|---|
| 3,268,474 | 8/1966 | Hardy et al. | 260—45.8 |
| 3,399,169 | 8/1968 | Horton | 260—45.95 |

FOREIGN PATENTS

| | | | |
|---|---|---|---|
| 679,986 | 2/1964 | Canada | 260—985 |

MURRAY TILLMAN, Primary Examiner

J. SIEBERT, Assistant Examiner

U.S. Cl. X.R.

260—45.8 N, 45.9 R, 45.95